US011255375B2

(12) United States Patent
Wales

(10) Patent No.: US 11,255,375 B2
(45) Date of Patent: Feb. 22, 2022

(54) MULTI-FUNCTION JOINT

(71) Applicant: Atelier Volant LLC, Jersey City, NJ (US)

(72) Inventor: Catherine Wales, Jersey City, NJ (US)

(73) Assignee: ATELIER VOLANT LLC, Jersey City, NJ (US)

(*) Notice: Subject to any disclaimer, the term of this patent is extended or adjusted under 35 U.S.C. 154(b) by 56 days.

(21) Appl. No.: 16/635,429

(22) PCT Filed: Aug. 10, 2018

(86) PCT No.: PCT/IB2018/056030
§ 371 (c)(1),
(2) Date: Jan. 30, 2020

(87) PCT Pub. No.: WO2019/030712
PCT Pub. Date: Feb. 14, 2019

(65) Prior Publication Data
US 2021/0088073 A1 Mar. 25, 2021

(30) Foreign Application Priority Data
Aug. 10, 2017 (GB) .................................. 1712823

(51) Int. Cl.
F16C 11/06 (2006.01)
(52) U.S. Cl.
CPC ...... *F16C 11/0604* (2013.01); *F16C 11/0657* (2013.01); *F16C 2226/74* (2013.01); *F16C 2362/00* (2013.01)

(58) Field of Classification Search
CPC .... H04B 1/3888; F16M 11/242; F16M 11/14; F16M 11/40; A63H 3/04; F16C 11/0657
See application file for complete search history.

(56) References Cited

U.S. PATENT DOCUMENTS

| 1,947,113 A | * | 2/1934 | Russell | A44C 11/002 59/35.1 |
| 3,323,325 A | * | 6/1967 | Meyer | A44C 11/002 63/4 |

(Continued)

FOREIGN PATENT DOCUMENTS

| CN | 101337127 A | 1/2009 |
| FR | 2303577 A | 10/1976 |

(Continued)

OTHER PUBLICATIONS

International Search Report and Written Opinion issued for PCT/IB2018/056030, dated Dec. 14, 2018.

(Continued)

Primary Examiner — Daniel J Wiley
(74) Attorney, Agent, or Firm — Westman, Champlin & Koehler, P.A.; Z. Peter Sawicki; Amanda M. Prose

(57) ABSTRACT

The invention provides a reusable linkage which has a coupling which coupling has one or more male connectors formed from two or more compressible leaves; and/or one or more female connectors wherein each female connector is shaped to receive a male connector; wherein the compressible leaves of the male connector are shaped to resiliently engage the female connector and wherein the leaves of the male connector are compressible such that a male connector can be removed from a female connector.

23 Claims, 7 Drawing Sheets

(56) References Cited

U.S. PATENT DOCUMENTS

| | | | |
|---|---|---|---|
| 3,451,064 A | 6/1969 | Dolan | |
| 3,458,949 A | 8/1969 | Young | |
| 3,597,874 A * | 8/1971 | Ogsbury | A63H 33/065 |
| | | | 446/104 |
| 3,648,404 A * | 3/1972 | Ogsbury | A63H 33/102 |
| | | | 446/126 |
| 3,747,261 A * | 7/1973 | Salem | A63H 33/108 |
| | | | 446/104 |
| 4,012,155 A * | 3/1977 | Morris | F16B 7/0413 |
| | | | 403/290 |
| 4,044,725 A * | 8/1977 | Miller | A01K 27/001 |
| | | | 119/865 |
| 4,417,569 A | 11/1983 | Brudny | |
| 5,049,105 A * | 9/1991 | Glickman | A63H 33/10 |
| | | | 446/126 |
| 5,620,352 A * | 4/1997 | Tzong | A63H 3/04 |
| | | | 446/102 |
| 5,769,681 A * | 6/1998 | Greenwood, Sr. | A63H 33/062 |
| | | | 446/120 |
| 5,897,417 A | 4/1999 | Grey | |
| 5,904,436 A | 5/1999 | Maughan et al. | |
| 5,913,319 A * | 6/1999 | Tsai | A45D 8/34 |
| | | | 132/247 |
| 6,233,737 B1 | 5/2001 | Ditchfield et al. | |
| 6,491,563 B1 | 12/2002 | Bailey | |
| 8,607,541 B1 * | 12/2013 | Cavuoti | A63H 33/062 |
| | | | 59/2 |
| 9,211,027 B2 * | 12/2015 | Ovist | A47H 21/00 |
| 2007/0154254 A1 | 7/2007 | Bevirt | |
| 2010/0221062 A1 | 9/2010 | Bevirt | |
| 2013/0210314 A1 | 8/2013 | Rottjer et al. | |
| 2013/0236238 A1 | 9/2013 | Burton | |
| 2016/0236111 A1 | 8/2016 | Lowry et al. | |

FOREIGN PATENT DOCUMENTS

| | | |
|---|---|---|
| FR | 2857232 A1 | 1/2005 |
| GB | 480227 A | 2/1938 |
| GB | 2006297 A | 5/1979 |
| GB | 2257455 A | 1/1993 |
| JP | H07292774 A | 11/1995 |

OTHER PUBLICATIONS

Written Opinion of the International Searching Authority issued for PCT/IB2018/056030, dated Dec. 14, 2018.

Search Report issued in GB patent application No. 1712823.2 dated May 31, 2018.

* cited by examiner

MULTI-FUNCTION JOINT

CROSS-REFERENCE TO RELATED APPLICATION

This Application is a Section 371 National Stage Application of International Application No. PCT/IB2018/056030, filed Aug. 10, 2018 and published as WO 2019/030712 on Feb. 14, 2019, in English, the contents of which are hereby incorporated by reference in their entirety.

The present invention relates to reusable female and male linkages and to a structure formed by combining them.

Frame structures are used in a variety of ways such as a toy or to support signage, clothing, or a tent. Existing structures cannot be used flexibly to create different shapes as they are not easy to dismantle. There is a need for linkages which can be mass produced but when assembled become personalized, for example by creating a tailored effect when placed around the body as a structure for draping cloth. There is a problem that it is not possible to merge tailoring and customization with mass manufacture of garments. There is a further problem that existing structures cannot be disassembled and reconstructed.

A way of ameliorating these problems has been sought.

According to the invention there is provided a reusable linkage which has a coupling which coupling has
  a. one or more male connectors formed from two or more compressible leaves; and/or
  b. one or more female connectors wherein each female connector is shaped to receive a male connector;
  wherein the compressible leaves of the male connector are shaped to resiliently engage the female connector and wherein the leaves of the male connector are compressible such that a male connector can be removed from a female connector.

According to the invention there is further provided a collection of linkages which comprises a plurality of reusable linkages according to the invention.

According to the invention there is also provided a structure assembled from the collection of linkages according to the invention.

Advantages of the invention include that the linkages have structural integrity when used together to form a structure but may easily be disassembled by pulling them apart. The collection according to the invention has a potential to build a huge number of different structures. Changing the size of the coupling female join or the length of the male join is down to which material or method of manufacture is chosen. The male connector may be inserted into the female connector, or removed therefrom multiple times and by choice.

In some embodiments, the male connector may be shaped in the form of a ball and the female connector may be in the form of a socket. Advantages of having the two or more leaves of the male connector shaped like a ball include that the male connector may be rotated in the female connector allowing different configurations.

In some embodiments, the reusable linkage may have a coupling to link the connectors together. In some embodiments, the coupling may have a linear, planar, spherical, ovoid, or polyhedral shape. In some embodiments, the coupling may have a spherical, ovoid, or polyhedral shape where the connector is a female connector. In some embodiments, the coupling may be in the form of a rod or a collar. In some embodiments, the coupling may comprise a plurality of rods which extend from a hub such as a central hub such that the coupling has a planar or three-dimensional shape. In some embodiments, the hub may be a flexible hub such that the orientation of one or more of the rods may be changed. In some embodiments, the coupling may be formed from a resilient plastics material.

In some embodiments, a female connector may be in the form of a socket. In some embodiments, the female connector may have a truncated spherical shape forming an internal wall.

In some embodiments, the female connector may have an opening which has a diameter which is narrower than the diameter of the socket formed by the internal wall.

In some embodiments, a male connector may be formed from three or more leaves. In some embodiments, the male connector may be formed from four leaves. In some embodiments, the male connector may be formed from two or more curved leaves. In particular, the curved leaves have a convex shape to engage an inner wall of the female connector. In some embodiments, one or more of the leaves of the male connector tapers from its end proximal to the coupling to its distal end, particularly such that a space is formed between each adjacent pair of leaves. In some embodiments, the leaves of the male connector are compressible. In some embodiments, the leaves of the male connector resiliently engage the internal wall of the female connector such that they have a substantially spherical shape.

In some embodiments, a linkage may be a fitting linkage wherein the coupling has a fitting for attachment to another object. A fitting may be in the form of a rod, hoop, or dual hoop. The advantage of having a fitting is that it allows other elements such as a strap or a wire to be attached to a structure including such a linkage.

In some embodiments, a linkage may be a decorative linkage wherein the coupling has a decorative element such as a feather, horn, disc, star, scale (such as a fish scale), a geometric object such as a face, and/or a face mask.

In some embodiments, a linkage may be hollow for receiving a light source, structural element (such as a supporting wire e.g. muscle wire) and/or an electrical connector. In some embodiments, a light source may be an optical fibre and/or an LED strip.

In some embodiments, the linkage may be a multiple linkage having three or more male and/or female connectors. In some embodiments, a multiple linkage may have three or more connectors of the same type. In some embodiments, the linkage may be a linear linkage having a linear coupling with a male or female connector at each end of the coupling. In some embodiments, a linear linkage may comprise two connectors of the same type.

In some embodiments, the collection may comprise a plurality of multiple linkages and a plurality of linear linkages. In some embodiments, the collection may comprise a plurality of multiple linkages each comprising connectors of a first type and a plurality of linear linkages comprising connectors of a second type. In some embodiments, the collection may additionally comprise one or more decorative linkages.

The invention will now be illustrated with reference to the following Figures of the accompanying drawings which are not intended to limit the scope of the claimed invention:

Figure 10:
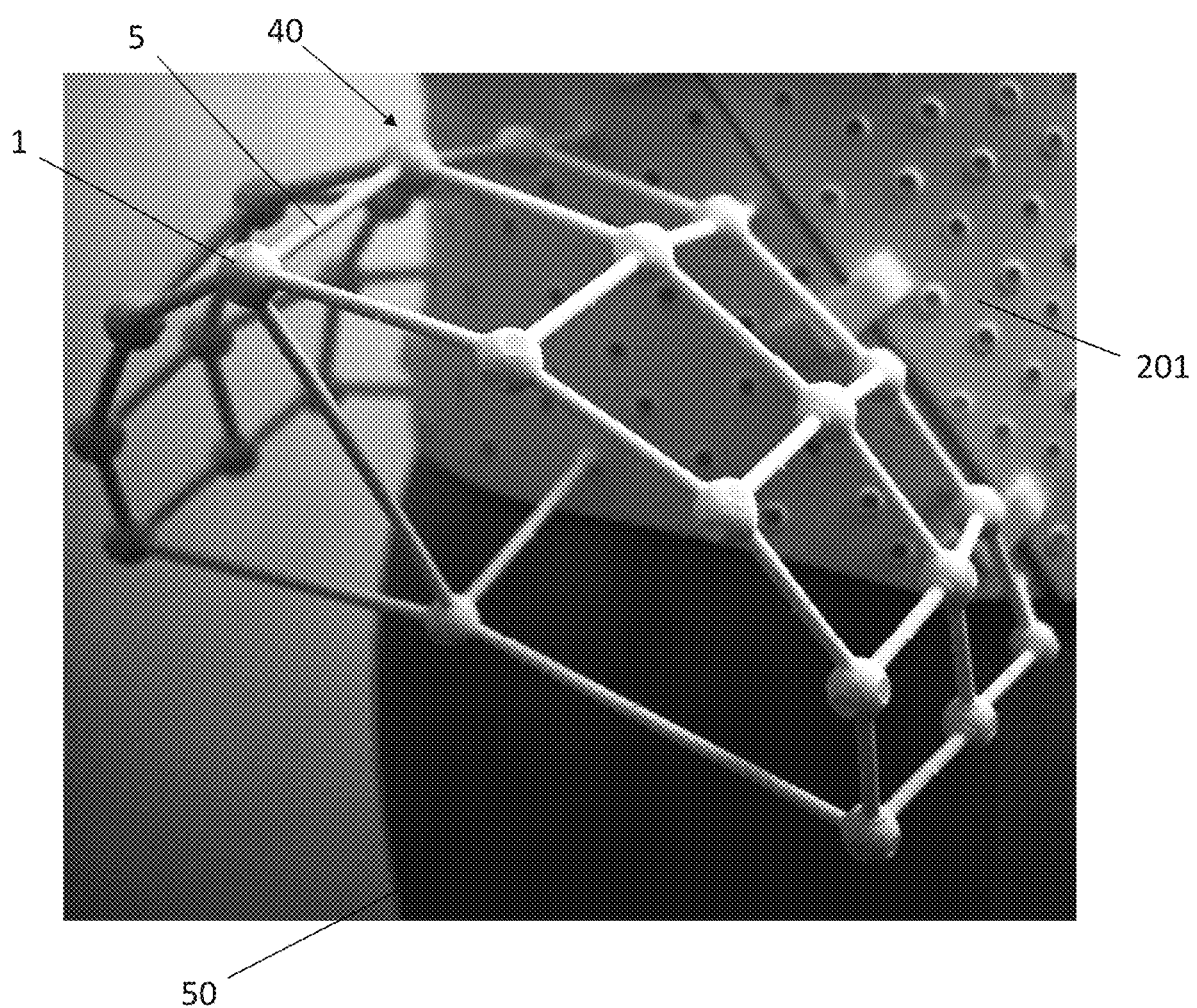
Figure 11:
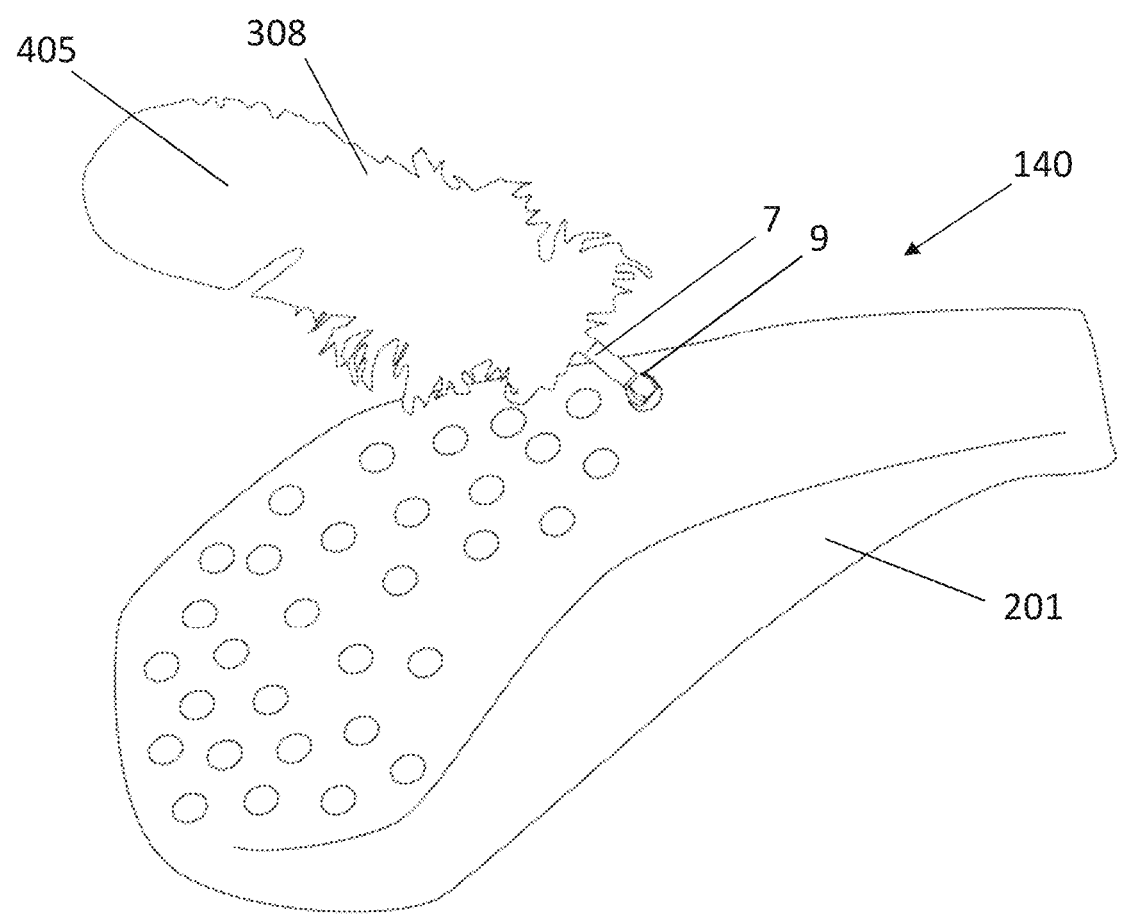

FIG. 10 shows a first embodiment of a structure according to the invention formed from a combination of female linkages according to the first and third embodiments of the invention and male linkages according to the first embodiment of the invention; and FIG. 11 shows a second embodiment of a structure according to the invention formed from a combination of female linkages according to the third embodiment of the invention and male linkages according to the first embodiment of the invention.

Figure 1A:
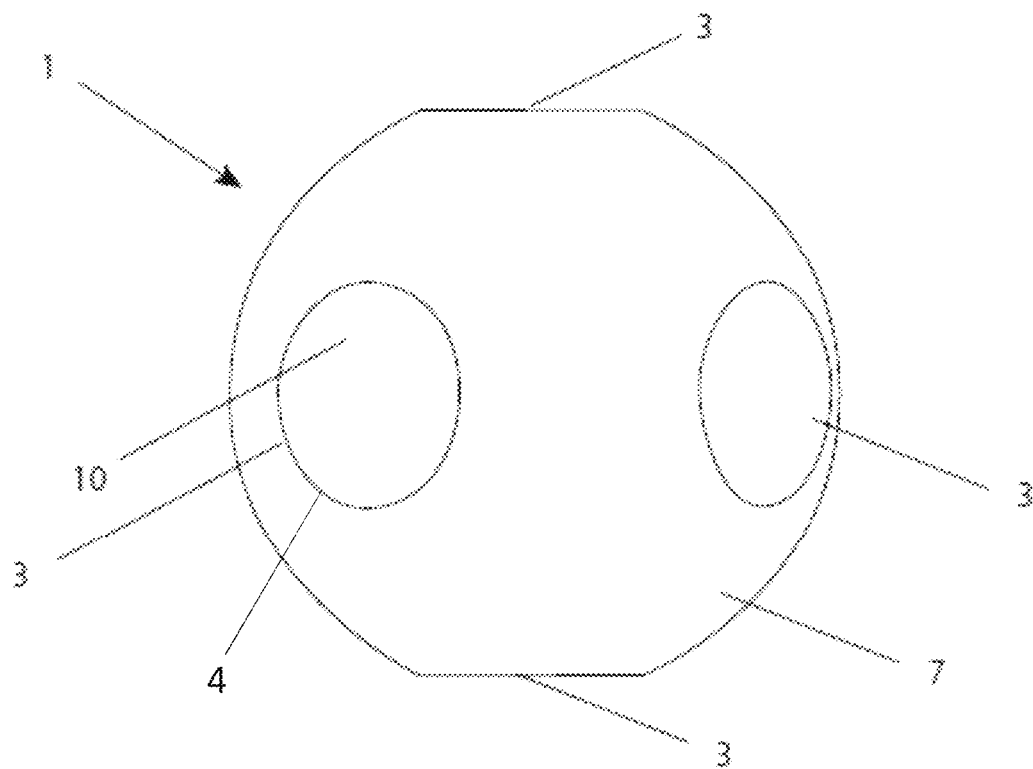
FIG. 1A shows a schematic perspective view of a female linkage according to the invention.
Figure 1B:
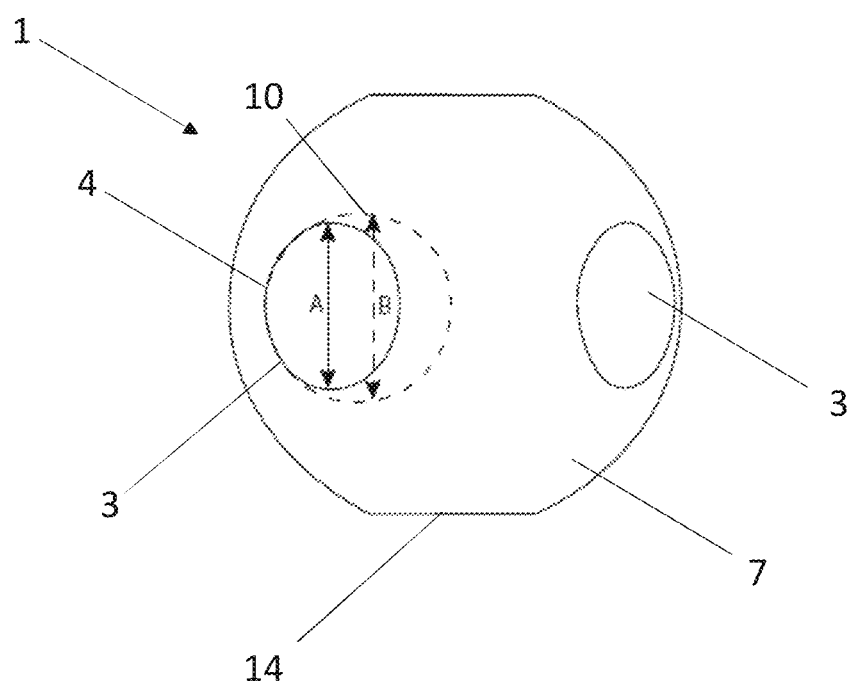
FIG. 1B shows a schematic perspective view of a female linkage according to the invention with an indication of different dimensions of a female socket.

A female linkage according to the invention is indicated generally at 1 on FIGS. 1A and 1B of the accompanying drawings. Female linkage 1 is a multiple female linkage 1 as it has six female connectors 3. Female linkage 1 has a coupling 7 which forms the six female connectors 3. Coupling 7 has a substantially spherical shape and is formed from a resilient plastics material. Each female connector 3 is in the form of a concave socket formed in coupling 7. Each female connector 3 has a truncated spherical shape forming an internal wall 10. Each female connector 3 has an opening 4 which has a diameter indicated at A on FIG. 1B which is narrower than the diameter indicated at B on FIG. 1B of the socket formed by the internal wall 10. The six female connectors 3 are arranged substantially orthogonally to each other, being at an approximate angle of about 90° to each other. Female linkage 1 is thus a multiple linkage as it allows up to six male linkages 5,105,205,305 to be connected to it. Each female connector 3 is shaped to receive a male connector 9 of a male linkage 5,105,205,305 according to the invention.

In an alternative embodiment, the female multiple linkage 1 may have a different number of female connectors such 2, 3, 4, 5, 7, 8 or 9. In an alternative embodiment, the female multiple linkage 1 may have a different shape such as an ovoid shape or a polyhedral shape having four or more faces. In an alternative embodiment, the female linkage 1 may be formed from an alternative material such as rubber, glass, metal, or wood. In an alternative embodiment, coupling 7 of female linkage 1 may have a hollow core with openings (not shown) which connect each connector 3 with the hollow core such that the female linkage 1 may receive an LED strip or optical fibre for illuminating the female linkage 1, a wire frame for supporting the female linkage 1 (such as muscle wire), and/or an electrical connector such as a wire.

Figure 2A:
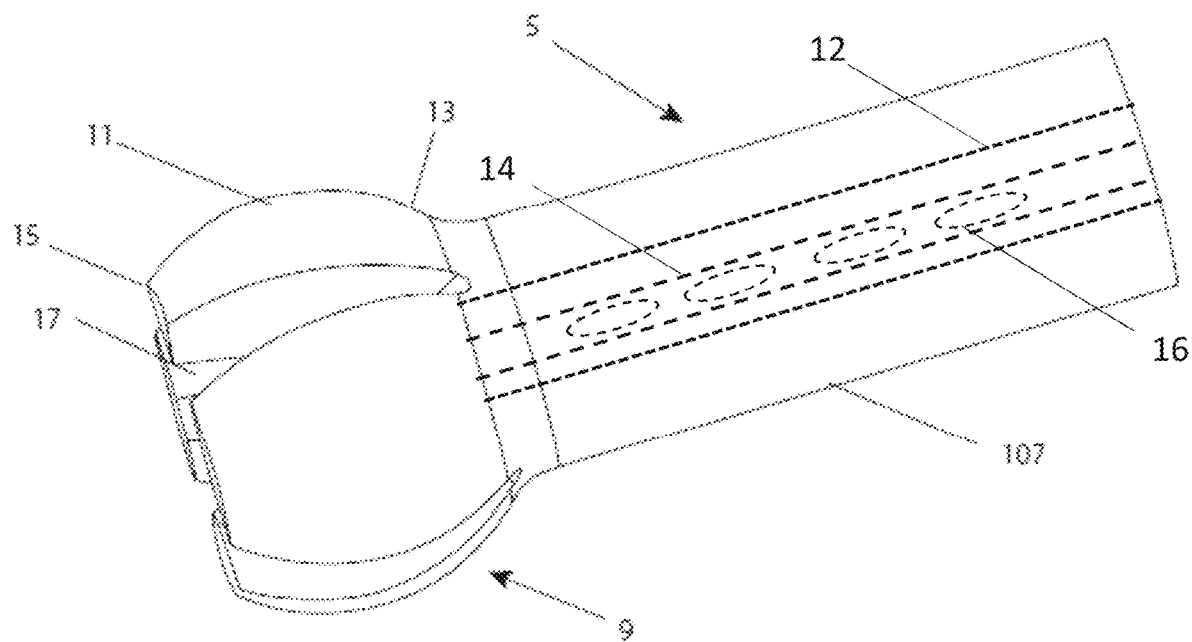
FIG. 2A shows a partial schematic perspective view of a first embodiment of a male linkage according to the invention.
Figure 2B:
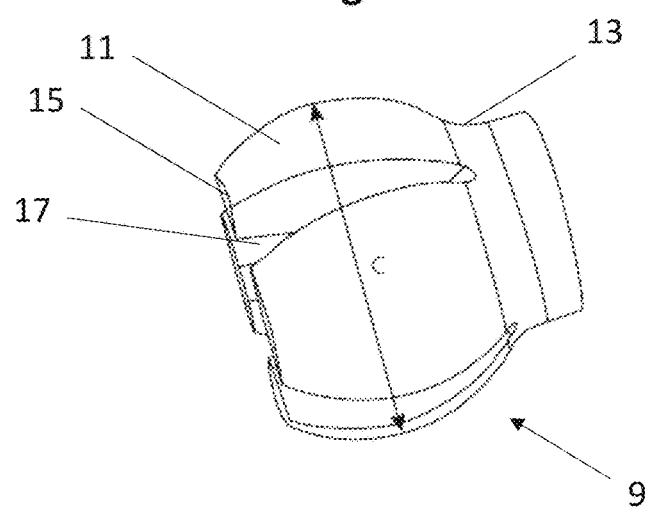
FIG. 2B shows a schematic perspective view of a male connector for use in the first embodiment of a male linkage according to the invention.
Figure 3:
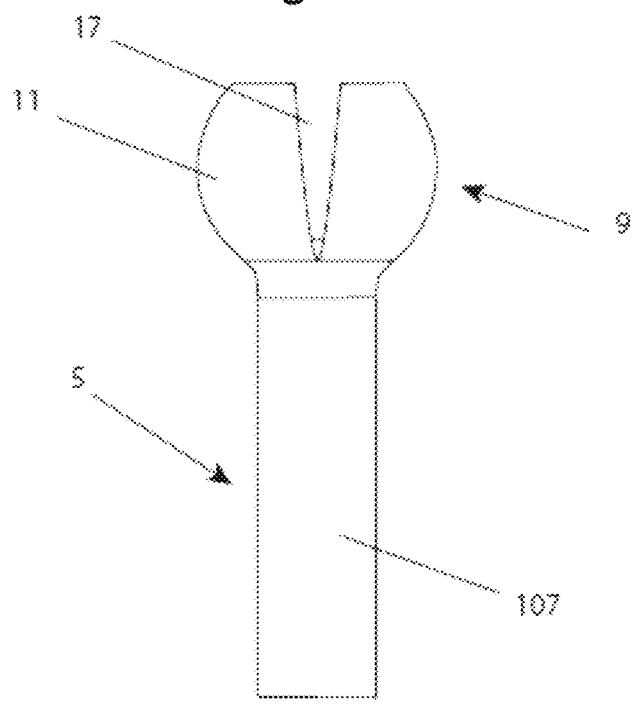
FIG. 3 shows a schematic plan view of the first embodiment of the male linkage according to the invention.
Figure 4:
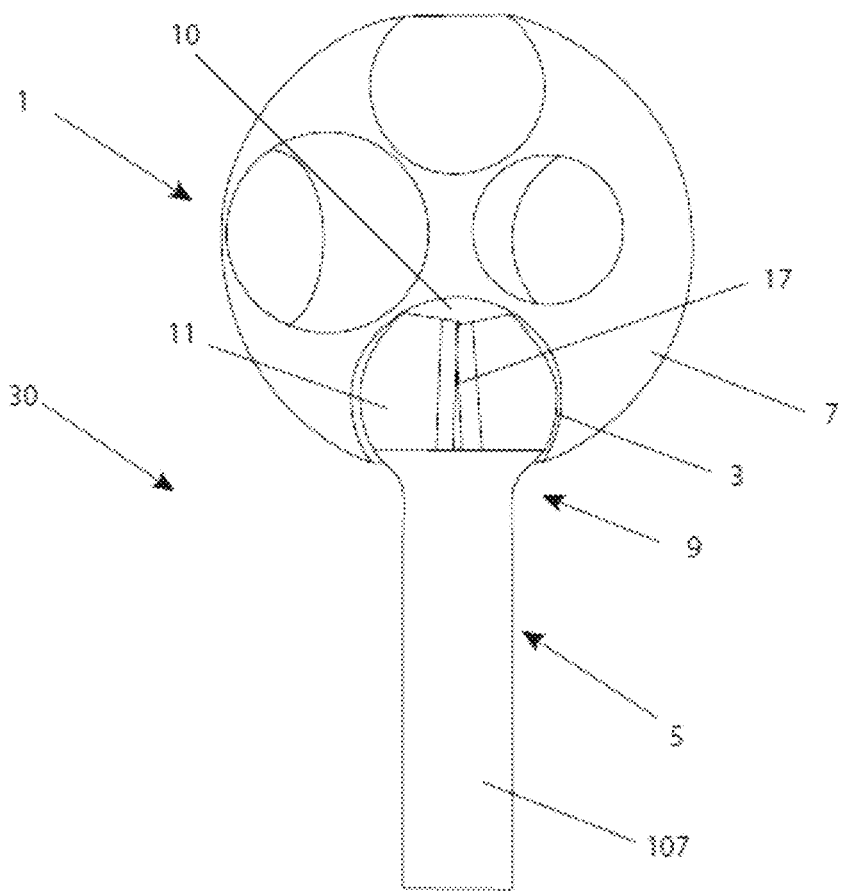
FIG. 4 shows a schematic cross-sectional view of a first embodiment of a paired linkage according to the invention.

A first embodiment of a male linkage according to the invention is indicated generally at 5 on FIGS. 2A, 2B, and 3 of the accompanying drawings. Male linkage 5 is a male linear linkage 5 as it has a linear coupling 107 in the shape of a hollow rod with a male connector indicated generally at 9 at each end of coupling 107. Hollow rod 107 forms an internal channel 12 for receiving a LED strip for illuminating the rod where the LED strip 14 has LED lamps 16 for providing the illumination. Each male connector 9 is formed from four curved plastic leaves 11. The curved plastic leaves 11 have a convex curved shape to engage the wall 10 of a female connector 3. Each leaf 11 tapers from its end 13 proximal to rod 107 to its distal end 15 such that a space 17 is formed between each adjacent pair of leaves 11 wherein space 17 widens from its end proximal to rod 107 to its distal end such that the four plastic leaves 11 are compressible such that the male connector 9 may be inserted through the opening 4 of a female connector 3. Leaves 11 are shaped to resiliently engage the internal wall 10 of the female connector 3 when they are not compressed such that they have a substantially spherical shape as shown in FIG. 4. Leaves 11 have a maximum diameter which is indicated at C on FIG. 2B. Diameter C complements diameter B of the female connector 3 such that there is sufficient friction that a male connector 9 remains in position when no force is applied to it but without there being so much friction that the position of male connector 9 cannot be changed. A male connector 9 may be removed from a female connector 3 by pulling the two apart such that the opening 10 of the female connector 3 compresses the leaves 11 of the male connector 9 such that their diameter is less than diameter A of the female connector 3 so that they fit through the opening 10.

In an alternative embodiment, the male linear linkage 5 may have a fitting 8,108 at one end of linear coupling 107 such that male linear linkage 5 is a male fitting linear linkage 5. In an alternative embodiment, the internal channel 12 may have an optical fibre for illuminating the rod, a wire frame for supporting the rod 107 (such as muscle wire), and/or an electrical connector such as a wire. In an alternative embodiment, the male linear linkage 5 may be formed from a transparent or translucent plastics material.

A paired linkage according to the invention is indicated generally at 30 on FIG. 4. Paired linkage 17 has a female linkage 1 and a male linkage 5. One male connector 9 of the male linkage 5 is engaged with one female connector 3 of the female linkage 1 by having been pushed into that female connector 3 such that the four plastic leaves 11 of the male connector 9 are compressed and resiliently engage the wall 10 of the female connector 3 such that the paired linkage 17 has structural integrity. The paired linkage 30 may easily be disassembled by pulling the female linkage 1 and male linkage 5 apart such that the linkages 1,5 are reusable linkages.

Figure 5:
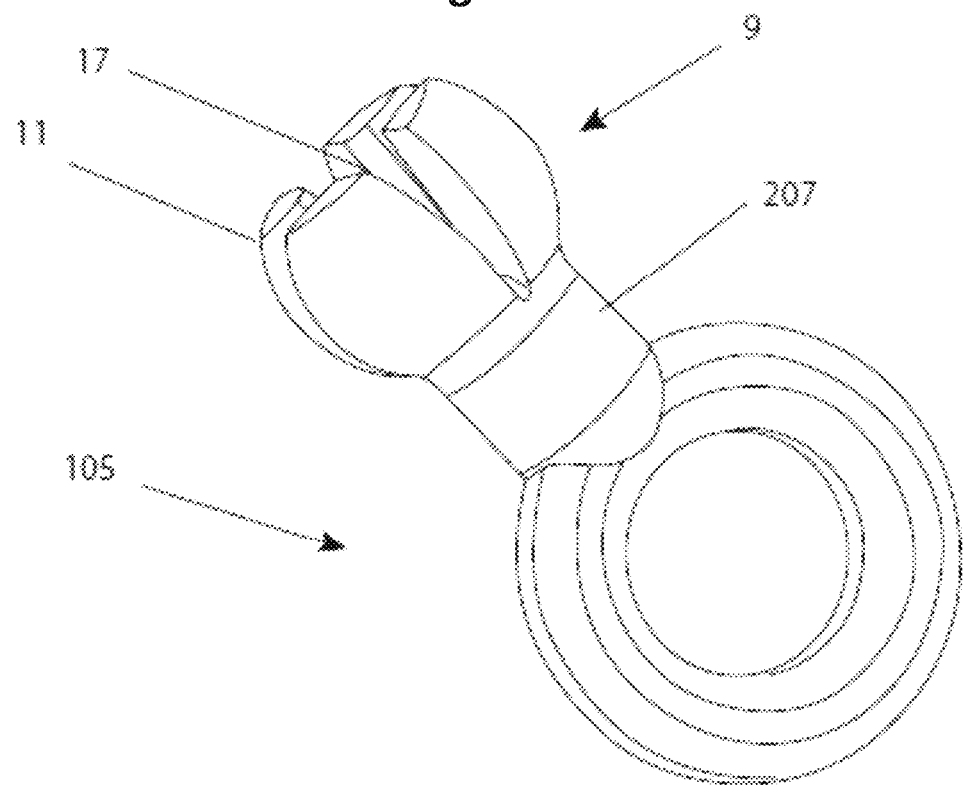
FIG. 5 shows a schematic perspective view of a second embodiment of the male linkage according to the invention.

A second embodiment of a male linkage according to the invention is indicated generally at 105 on FIG. 5 of the accompanying drawings. Male linkage 105 is a male fitting linkage 105 as it has a fitting 8 and a male connector indicated generally at 9 linked by coupling 207. Coupling 207 is a linear coupling in the form of a collar which is formed on fitting 8. Fitting 8 is in the form of a hoop. Each male connector 9 is formed from four curved plastic leaves 11 wherein each leaf 11 tapers from its end proximal to coupling 207 to its distal end such that a space 17 is formed between each adjacent pair of leaves 11 wherein space 17 widens from its end proximal to coupling 207 to its distal end such that the four plastic leaves 11 are compressible and resiliently engage the internal wall 10 of a female connector 3 such that they have a substantially spherical shape. Hoop 8 allows other elements (not shown) such as straps or wires to be attached to a structure 40 comprising male linkage 105 such that structure 40 may be suspended or used to suspend an object (not shown).

Figure 6:
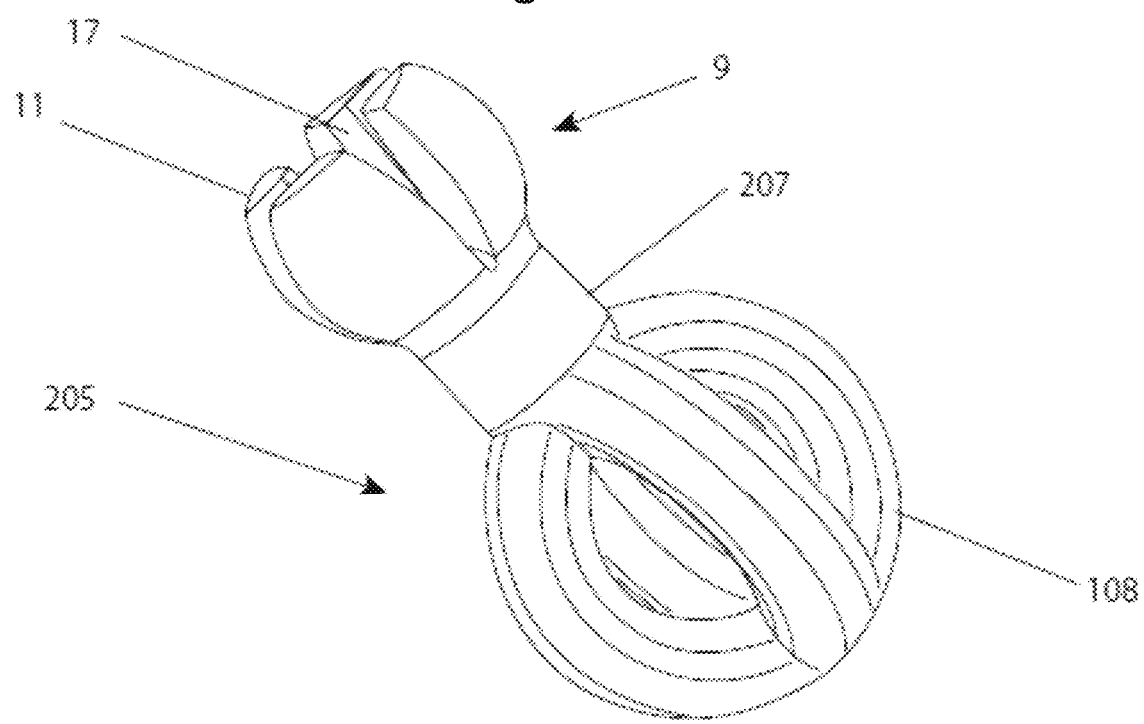
FIG. 6 shows a schematic perspective view of a third embodiment of the male linkage according to the invention.

A third embodiment of a male linkage according to the invention is indicated generally at 205 on FIG. 6 of the accompanying drawings. Male linkage 205 is a male fitting linkage 205 as it has a fitting 208 and a male connector indicated generally at 9 linked by a coupling 207. Coupling 207 is a linear coupling in the form of a collar which is formed on fitting 108. Fitting 208 is in the form of a dual hoop. The male connector 9 is formed from four curved plastic leaves 11 wherein each leaf 11 tapers from its end proximal to coupling 207 to its distal end such that a space 17 is formed between each adjacent pair of leaves 11 wherein space 17 widens from its end proximal to coupling 207 to its distal end such that the four plastic leaves 11 are compressible and resiliently engage the internal wall 10 of a female connector 3 such that they have a substantially spherical shape. Dual hoop 108 allows other elements (not shown) such as straps or wires to be attached to a structure 40 comprising male linkage 205 such that structure 40 may be suspended or used to suspend an object (not shown).

Figure 7:
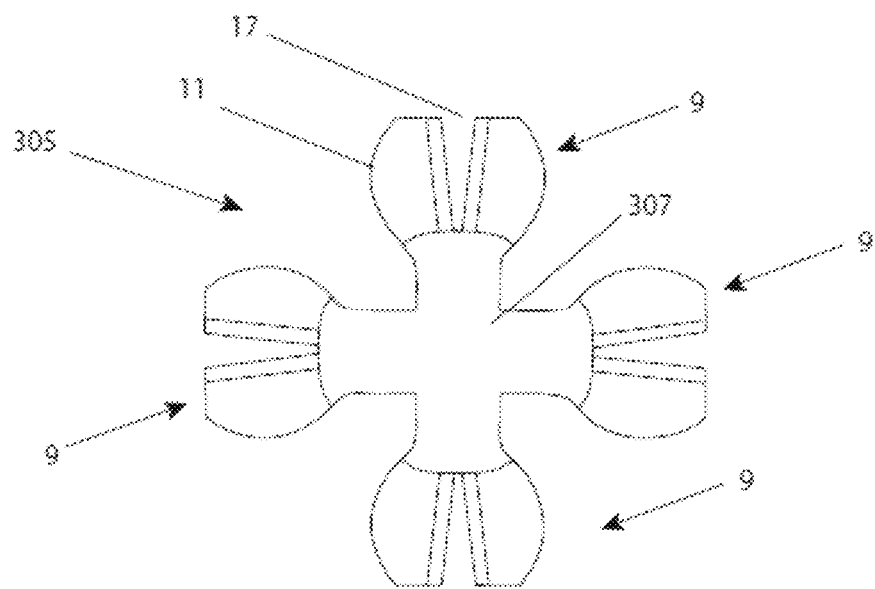
FIG. 7 shows a schematic perspective view of a fourth embodiment of the male linkage according to the invention.

A fourth embodiment of a male linkage according to the invention is indicated generally at 305 on FIG. 7 of the accompanying drawings. Male linkage 305 is a multiple male linkage 305 as it has four male connectors indicated generally at 9 mounted on the ends of a cross-shaped planar coupling 307 formed by four rods extending from a central hub. The male connector 9 is formed from four curved plastic leaves 11 wherein each leaf 11 tapers from its end proximal to coupling 307 to its distal end such that a space 17 is formed between each adjacent pair of leaves 11 wherein space 17 widens from its end proximal to coupling 307 to its distal end such that the four plastic leaves 11 are compressible and resiliently engage the internal wall 10 of a female connector 3 such that they have a substantially spherical shape.

In an alternative embodiment, the male multiple linkage 305 may have a different number of male connectors 9 such as 3, 5, 6, 7, 8 or 9 male connectors 9 which are mounted on a corresponding number of rods on coupling 307. In an alternative embodiment, the coupling 307 may have a number of rods which is greater than the number of male connectors wherein a fitting 8,108 is provided on each of the additional rods. In an alternative embodiment, the coupling 307 may have a three-dimensional shape. In an alternative embodiment, the coupling 307 may have a regular three-dimensional shape such as that formed by a combination of rods where each rod extends from a hub towards the centre of a face of a notional polyhedral shape or of a regular prism. In an alternative embodiment, the coupling 307 may have a flexible hub such that the orientation of its rods may be changed. In an alternative embodiment, one or more male connectors 9 may be replaced by a corresponding number of female connectors 3.

Figure 8:
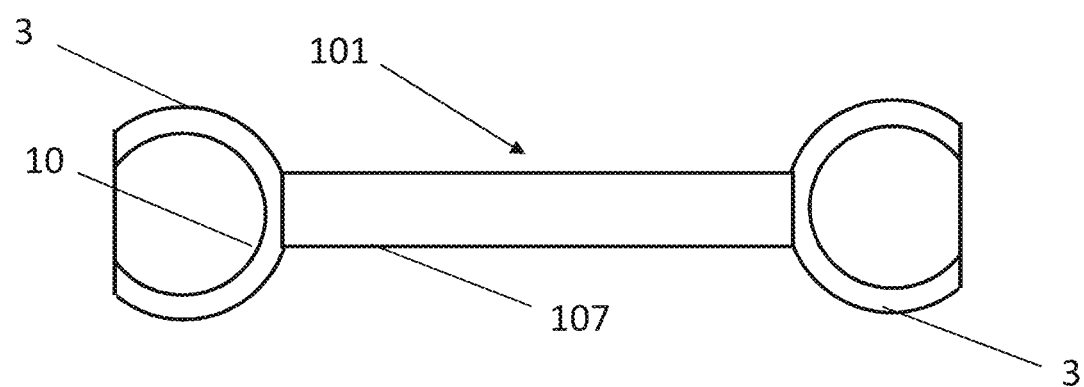
FIG. 8 shows a schematic perspective view of a second embodiment of a female linkage according to the invention.

A second embodiment of a female linkage according to the invention is indicated generally at 101 on FIG. 8 of the accompanying drawings. Female linkage 101 is a female linear linkage 101 as it has a linear coupling 107 in the form of a rod with a female connector 3 at each end of coupling 107. Each female connector 3 is in the form of a socket having a truncated spherical shape forming an internal wall 10.

In an alternative embodiment, one of the female connectors 3 may be replaced by a male connector 9 or by a fitting 8,108.

Figure 9:
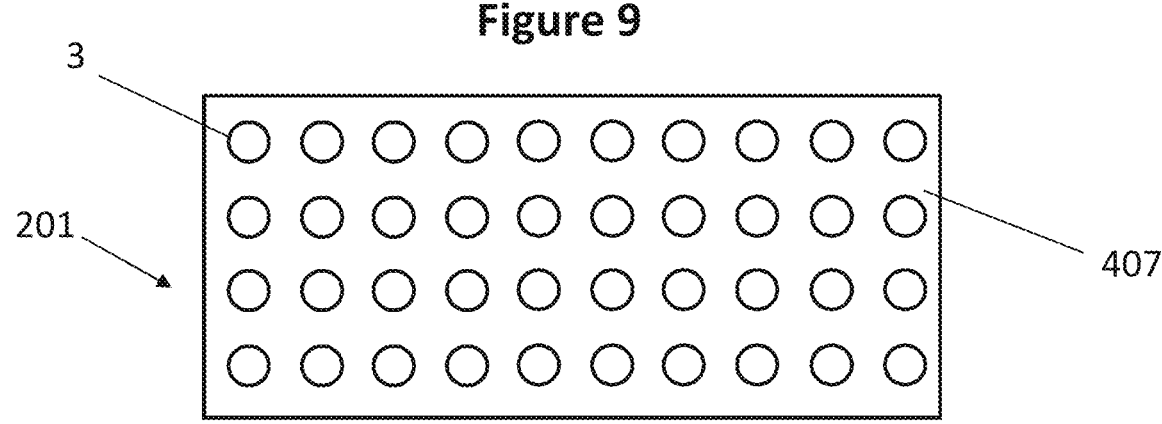
FIG. 9 shows a schematic perspective view of a third embodiment of a female linkage according to the invention.

A third embodiment of a female linkage according to the invention is indicated generally at 201 on FIG. 9 of the accompanying drawings. Female linkage 201 is a female plate linkage 201 as it has a planar coupling 407 in the form of a rectangular plate with an array of female connectors 3 formed on its surface. Each female connector 3 is in the form of a socket having a truncated spherical shape forming an internal wall 10.

In an alternative embodiment, the plate-shaped coupling 407 may have a different shape such as a regular or irregular polygonal which may be curved such that it moulds to another object such as a human or animal body.

A first embodiment of a structure according to the invention is indicated generally at 40 on FIG. 10 of the accompanying drawings. Structure 40 is formed from a plurality of interconnected female multiple linkages 1 and male rod linkages 5, mounted on a female plate linkage 201 which is mounted on a mannequin 50. The structure 40 has an arched shape with a matrix of female multiple linkages 1 which is eight female linkages 1 long by three female linkages 1 wide which are interconnected by male linkages 5. A plurality of female linkages 1 on the inner side of the arched structure 40 are connected by male linkages 5 to the female plate linkage 201. Elongated male rod linkages 5 connect the outer female linkages 1 at each end of the arched shape and an outer female linkage 1 at the top of the arched shape to a central female linkage 1 which is also connected by an elongated male rod linkage 5 to the female plate linkage 201. Thus, in combination the linkages 1,5,201 provide a structure 40 having structural integrity which can be used to support fabric for example for an article of clothing or costume. The structure 40 may easily be dismantled by pulling the linkages 1,5,201 apart and reassembled in a different shape by pushing them back together.

A second embodiment of a structure according to the invention is indicated generally at 140 on FIG. 11 of the accompanying drawings. Structure 140 is formed from a plurality of male fitting linkages 405 mounted on a female plate linkage 201. The male fitting linkages 405 have a fitting 308 in the form of a decorative feather at one end and a male connector 9 at the other end where the fitting 308 and the male connector 9 are connected by a rod coupling 7. The structure 40 may easily be dismantled by pulling the linkages 1,5,201 apart and reassembled in a different shape by pushing them back together.

The invention claimed is:

1. A reusable linkage which has a coupling which coupling has one or more male connectors formed from two or more compressible leaves;
   wherein the compressible leaves of a male connector are shaped to resiliently engage a female connector and wherein the leaves of the male connector are compressible such that a male connector can be removed from the female connector; and
   wherein one or more of the leaves of the male connector tapers from its end proximal to the coupling to its distal end such that a space is formed between an adjacent pair of leaves.

2. The linkage as defined in claim 1 wherein the male connector is shaped in the form of a ball.

3. The linkage as defined in claim 1 which comprises two or more connectors and wherein the coupling links the two or more connectors together.

4. The linkage as defined in claim 1 wherein the coupling has a linear, planar or three-dimensional shape.

5. The linkage as defined in claim 4 wherein the coupling is in the form of a rod or a collar.

6. The linkage as defined in claim 4 wherein the coupling comprises a plurality of rods which extend from a hub.

7. The linkage as defined in claim 6 wherein the hub is a central hub such that the coupling has a planar or three-dimensional shape.

8. The linkage as defined in claim 6 wherein the hub is a flexible hub such that the orientation of one or more of the rods may be changed.

9. The linkage as defined in claim 1 wherein the coupling is formed from a resilient plastics material.

10. The linkage as defined in claim 1 wherein the male connector is formed from two or more curved leaves.

11. The linkage as defined in claim 10 wherein the two or more curved leaves have a convex shape to engage an inner wall of the female connector.

12. The linkage as defined in claim 1 which has a fitting for attachment to another object.

13. The linkage as defined in claim 1 which has a decorative element.

14. The linkage as defined in claim 1 wherein the coupling is hollow for receiving a light source, structural element, and/or an electrical connector.

15. The linkage as defined in claim 1 which is a multiple linkage having three or more male and/or female connectors.

16. A collection which comprises a plurality of multiple linkages as defined in claim 15 and a plurality of linear linkages having a coupling in the form of a rod or a collar.

17. A collection which comprises a plurality of reusable linkages as defined in claim 1.

18. A structure which is formed by assembling the collection of linkages as defined in claim 17.

19. A collection as defined in claim 17 which comprises a reusable linkage which has a coupling which coupling has one or more female connectors wherein each female connector is shaped to receive a male connector.

20. A linkage as defined in claim 1 wherein the coupling has one or more female connectors wherein each female connector is shaped to receive a male connector.

21. A linkage as defined in claim 20 wherein the female connector is in the form of a socket.

22. A linkage as defined in claim 20 wherein the coupling has a linear, planar or three-dimensional shape and wherein the coupling has a spherical, ovoid, or polyhedral shape.

23. A linkage as defined in claim 20 wherein the female connector has a truncated spherical shape forming an internal wall.

* * * * *